Patented Aug. 18, 1953

2,649,435

UNITED STATES PATENT OFFICE 2,649,435

POLYMERIZATION OF ACRYLONITRILE IN PRESENCE OF FORMYLATED POLYVINYL ALCOHOL

Theodore E. Stanin and Joseph B. Dickey, Kingsport, Tenn., assignors to Eastman Kodak Company, Rochester, N. Y., a corporation of New Jersey No Drawing. Application December 5, 1951, Serial No. 260,103

12 Claims. (Cl. 260—45.5)

This invention relates to new polymer compositions and a method for making them. More particularly, it relates to new polymer compositions obtained by polymerizing acrylonitrile in the presence of formylated polyvinyl alcohol.

The instant application is a continuation-in-part of our application Serial No. 233,931, filed June 27, 1951, which in turn, is a continuation-in-part of our application Serial No. 151,808, filed March 24, 1950 (now U. S. Patent 2,558,793, issued July 3, 1951).

Acrylonitrile has previously been used in the preparation of various polymers which are characterized by insolubility, or very low solubility, in many of the usual organic solvents. Many of these polymers, especially those containing high percentages of acrylonitrile, are further characterized by their lack of susceptibility to organic dyes, it being well known that fibers spun from polyacrylonitrile solutions can be passed through dye baths without material amounts of the dye adhering to the fiber.

Attempts have been made to increase the dyeability of polyacrylonitrile fibers by interpolymerizing acrylonitrile with certain monomers whose polymers have an affinity for dyes. While this procedure does give polymer products from which fibers having good dyeing properties can be obtained, a serious drawback arises in many instances due to a substantial lowering of the softening point of the fiber. For example, while an interpolymer of acrylonitrile and vinyl formate containing large amounts of acrylonitrile in the polymer molecule can be drawn into fibers readily susceptible to dyes, the softening point of such fibers is too low for practical purposes, softening of the fibers being observed at temperatures of about 150° C. Interpolymers of acrylonitrile and vinyl formate have previously been suggested in Billig U. S. Patent 2,317,725, dated April 27, 1943, however, fibers prepared from the polymer compositions shown in this reference are too low in their softening temperature to be of practical use.

Other attempts have been made to increase the dyeability of polyacrylonitrile fibers by mixing with the polyacrylonitrile, before spinning, other polymeric materials which are dye-susceptible. This procedure likewise provides fibers having good dyeing properties, however, many of these fibers show a low softening point, and in addition many show segmentation into their individual components along their horizontal axis. For example, it can be demonstrated that mixtures of polyvinyl acetate and polyacrylonitrile, when dissolved in either N,N-dimethylformamide or N,N-dimethylacetamide in proportions varying from 15 to 50 per cent by weight of polyvinyl acetate based on the total weight of the mixed polyacrylonitrile and polyvinyl acetate, form grainy dopes which separate into two liquid layers on standing. This is also true of many other polymeric compounds, natural or synthetic, which are soluble in the above solvents. Fibers which form from these non-homogeneous solutions or mixtures of polyacrylonitrile and polyvinyl acetate are too low in softening temperature to be of practical value, and also are subject to the defect of segmentation. This is not surprising because of the non-homogeneous condition of the spinning solution and the fact that it is generally known that polyacrylonitrile is not compatible with many organic substances.

We have now made the unusual and valuable discovery that certain polymer compositions of acrylonitrile and formylated polyvinyl alcohol can be obtained which form stable solutions which do not separate into distinct layers on standing, and from which fibers of homogeneous character can be spun. These compositions have a softening point higher than that of the interpolymers referred to above, and do not exhibit the segmentation defect shown by many of the fibers prepared from certain prior art mixtures comprising polymerized acrylonitrile.

It is, therefore, an object of our invention to provide new polymer compositions obtained by polymerizing acrylonitrile in the presence of formylated polyvinyl alcohol.

A further object is to provide homogeneous solutions of these new polymer compositions.

Still another object is to provide fibers obtained from these homogeneous solutions. Other objects will become apparent from a consideration of the following description and examples.

According to our invention we provide new polymer compositions by polymerizing a mixture comprising from 60 to 90 per cent by weight of acrylonitrile and from 40 to 10 per cent by weight of formylated polyvinyl alcohol.

The formylated polyvinyl alcohol useful in practicing our invention contains from 10 to 40.27 per cent by weight of formyl (HCO—). Formylated polyvinyl alcohol containing 40.27 per cent by weight of formyl corresponds essentially to polyvinyl formate, while lesser amounts correspond essentially to partially hydrolyzed polyvinyl formate. These latter can be obtained by partially hydrolyzing polyvinyl formate according to known methods. (See, for example, U. S.

Patent 2,360,308, dated October 10, 1944). Formylated polyvinyl alcohol containing from 20 to 35 per cent by weight of formyl has been found to be especially useful in practicing our invention, and such a formylated polyvinyl alcohol can be obtained by partially hydrolyzing polyvinyl formate by heating on a steam bath in the presence of aqueous alkali, e. g. potassium hydroxide, or by alcoholysis in the presence of anhydrous alcohol and an alkali.

Alternatively, the formylated alcohol useful in practicing our invention can advantageously be obtained by partially esterifying polyvinyl alcohol with formic acid. The formic acid can be diluted with water to control the amount of formylation. There appears to be an equilibrium between the extent of formylation and the amount of water present in the acid, since a plot of the strength (%) of formic acid versus the percent formyl in the resulting polymer forms a fairly good straight line. Thus by appropriately varying the strength of formic acid, one can prepare a formylated polyvinyl alcohol of predetermined constitution. The following table shows the linear increase of percent formyl with increasing strength of the formic acid.

TABLE I

| Percent by Weight Formic Acid | Percent by Weight Formyl |
|---|---|
| 50 | 14.1 |
| 62.5 | 20.2 |
| 65 | 21.5 |
| 70 | 23.5 |
| 75 | 25.5 |
| 77.5 | 27.5 |
| 80 | 29.0 |
| 82.5 | 29.5 |
| 85 | 30.5 |
| 90 | 31.9 |
| 97.5 | 36.2 |
| 100 | 37.0 |

The above esterifications are performed in the absence of a mineral acid, or strong organic acid, esterifying agent, and formylation is never 100 per cent complete. In the event such an esterifying agent is employed, the formylation can be accelerated, and when employing 100 per cent formic acid in the presence of a strongly acid esterification catalyst, e. g. chloroacetic acid, it is possible to obtain essentially complete formylation as shown in our application Serial No. 151,808.

Advantageously, the polymerization can be accelerated by heating, temperatures of from 20° to 70° C. having been found to be especially useful, although higher or lower temperatures can be used, if desired.

The polymerization can be further accelerated by adding at least one of the catalysts known to accelerate the polymerization of vinyl compounds. Typical catalysts includes the organic and inorganic peroxide polymerization catalysts, such as hydrogen peroxide, persulfates (e. g. the alkali metal persulfates, such as sodium, potassium, etc. persulfates, and ammonium persulfate), perborates (e. g. the alkali metal perborates, such as sodium, potassium, etc, perborates, and ammonium perborate), percarbonates (e. g. the alkali metal percarbonates, such as sodium, potassium, etc. percarbonates), ozone, peracetic acid, triacetone peroxide, urea peroxide, acetyl peroxide, benzoyl peroxide, acetyl benzoyl peroxide, lauroyl peroxide, oleoyl peroxide, etc. Other polymerization catalysts, such as triethyl phosphite, organic azines, etc. can also be used to increase the speed of polymerization. The quantity of catalyst used can be varied, however, we have found that from 0.01 per cent to 2 per cent by weight, based on the weight of acrylonitrile, can be used to advantage.

Advantageously, the polymerization can be effected with or without a diluent. Polymerization in an aqueous medium has been found to be especially useful, in that it is thus possible to use more conveniently many of the water-soluble polymerization catalysts such as the persulfates. An organic solvent miscible with water can be added to the aqueous medium and the polymerization carried out in solution, or an emulsifying agent can be added to the aqueous medium, and the polymerization carried out in an emulsion.

For solution polymerization, an aqueous acetone solution can be used to give especially advantageous results, although other solvents, such as ethanol, n-propanol, isopropanol, etc. can be used. Aqueous acetone solutions containing from 30 to 70 per cent by volume of water and from 70 to 30 per cent by volume of acetone are representative of the solutions which can be used.

Typical emulsifying agents which we can use in emulsion polymerizations include the alkali metal salts or fatty alcohol sulfates (e. g. sodium lauryl sulfate, etc.), alkali metal salts of aromatic sulfonic acids (e. g. sodium isobutylnaphthalenesulfonate, etc.) sulfosuccinic acid esters, their alkali metal salts or amine addition salts, alkali metal salts of fatty acids containing from 12 to 20 carbon atoms, sulfonated fatty acid amides or their alkali metal salts, the complex reaction products obtained by reacting ethylene oxide with aliphatic alcohols and amines, polyvinyl alcohol polymers, etc.

It is sometimes advantageous to heat the acrylonitrile and formylated polyvinyl alcohol together a short time before adding the polymerization catalyst. This increases the amount of cyanoethylation, and increases the compatibility and homogeneity of the final products. After as much cyanoethylation has occurred as is possible, the polymerization catalyst can be added and heating continued until the polymerization is substantially complete.

The pH of the polymerization medium can be varied from about 3 to 10, although a pH from 4 to 7 has given especially useful results. Acids, such as orthophosphoric acid, ethanesulphonic acid, oxalic acid, can be added to the polymerization medium, if desired. The air above the polymerization medium can be replaced with an inert gas, such as nitrogen, carbon dioxide, etc. prior to polymerization.

When the polymerization is nearly complete as evidenced by a drop in reaction heat, we have found that it is generally convenient to maintain the reaction temperature for an adidtional period of time to complete the polymerization. Any unreacted monomer is then distilled off under normal or reduced pressures. The reaction mixture contains from about 20 to 40 per cent solids, which are filtered off, or in the event the polymer products are obtained in the form of an emulsion, the emulsion is first broken by heating with a 1 to 2 per cent solution of sodium chloride, or aluminum sulfate, and the products then filtered off. After washing the polymers with water, they are dried in warm air at 60°–80° C. The drying can be accelerated by using a low boiling solvent in the final washing steps. The polymer products obtained in our invention having a molecular weight of from about 40,000 to 100,000 have been found to be of special utility.

The polymer compositions of our invention can be dissolved in solvents, such as N,N-dimethylformamide and N,N-dimethylacetamide to form stable solutions which do not show any marked tendency to separate. The lack of graniness in these solutions permits smooth, trouble-free extrusion through jets in the spinning of fibers, and permits storage of these solutions prior to spinning without troublesome separations of the solutions into two distinct layers. Especially useful compositions comprise those containing from 65 to 80 per cent by weight of polymerized acrylonitrile and from 35 to 20 per cent by weight of the formylated polyvinyl alcohol. These compositions provide fibers which can be deeply dyed with acetate, viscose, acid and basic dyes. The tenacity of the fibers obtained measures between 2.0 and 4.5 grams per denier depending on the spinning, drafting, and shrinking conditions, and the elongation is 16 to 25 per cent at break depending upon the shrinking conditions. The sticking temperatures of the fibers, as measured on a hot bar, lie around 200° C., and moisture absorption is 3 to 5 per cent at 60 per cent relative humidity, depending upon the amount of formylated polyvinyl alcohol used in the polymerization mixture, and the per cent formyl in the polymer.

The following examples will serve to illustrate more fully the manner whereby we practice our invention.

Example 1

20 g. of polyvinyl alcohol (low-viscosity) were dissolved in 100 cc. of 50% by weight formic acid, and the solution was tumbled overnight at 23° C. The polymer was isolated by precipitating the acid solution in acetone, filtered, and then dried in a vacuum-oven heated to 50%. The polymer weighed 21 g. and contained 14.1% by weight of formyl.

9 g. of the formylated polyvinyl alcohol obtained above were dissolved in 200 cc. of water and 21 g. of acrylonitrile were added. The mixture was shaken well and 0.4 g. of dodecyl mercaptan, 0.4 g. of ammonium persulfate and 0.4 g. of sodium bisulfite were then added. The vessel was stoppered, shaken well, and allowed to stand overnight. The polymer which separated from solution was filtered, washed with water and dried. The inherent viscosity as determined in a 0.25% solution in N,N-dimethylformamide was 1.6. The yield of polymer was 27 g. and it contained 79% by weight of acrylonitrile by nitrogen analysis.

3 g. of the acrylonitrile-formylated polyvinyl alcohol polymer thus obtained were dissolved in 20 cc. of N,N-dimethylformamide. The resulting solution was then spun through a single filament spinnerette into a coagulating bath of isopropyl alcohol. The filament was drafted 700% in a hot air chamber heated to 140° C. and then wound on a drum in bundles of approximately 50 filaments, removed and twisted into lengths of yarn 1-meter long. The yarn samples had a tenacity of 3.8 grams per denier and extensibility of 22%, and a bar-sticking temperature of 240° C. It dyed well with vat, basic, acid and direct dyes.

Alternatively, the polymer solutions can be extruded into heated air, steam, or other gaseous media.

Example 2

200 cc. of distilled water were placed in a screw-cap bottle and 5 g. of formylated polyvinyl alcohol containing 21.4 per cent by weight of formyl were dissolved in the water. To this solution were added 20 g. of acrylonitrile, 0.40 g. of oxalic acid, 0.40 g. of ammonium persulfate and 0.80 g. of sodium bisulfite. The bottle was tightly closed, shaken well and allowed to stand overnight. The resulting polymer was filtered off, washed with water and ethanol, and dried in a hot air oven. The dried polymer was white and weighed 22 g.

A solution of 12 g. of the polymer obtained above in 100 cc. of N,N-dimethylformamide containing 0.50 per cent phosphorus pentoxide was spun into a coagulating bath containing water. The fibers acquired strength and lustre upon drafting in a hot air chamber. The fibers dyed well with acetate and direct dyes.

Example 3

An emulsion of 5 g. of formylated polyvinyl alcohol in 200 cc. of water containing 2 g. of a dispersing agent (Triton N-100, an aryl alkyl polyether-alcohol) was prepared by passing the above mixture as a slurry through a colloid mill. To the emulsion were added 20 g. of acrylonitrile, 0.40 g. of oxalic acid, 0.40 g. of ammonium persulfate and 0.80 g. of sodium bisulfite. The mixture was contained in a tightly closed bottle and tumbled at room temperature. The emulsion was broken by the addition of an aqueous salt solution, and precipitate was collected on a filter, washed and dried. It was obtained as a white powder weighing 24 g.

The polymer spun well from a solution in N,N-dimethylacetamide and the fibers obtained were deeply dyed by acetate dyes.

Example 4

6. g. of formylated polyvinyl alcohol containing 40.27 per cent by weight of formyl were dissolved in 200 cc. of water and 24 g. of acrylonitrile, 0.4 g. of dodecyl mercaptan, 0.4 g. of ammonium persulfate, and 0.4 g. of sodium bisulfite were added. The solution was tumbled overnight in a tightly closed bottle. The precipitated product was collected on a filter, washed and dried.

The polymer product dissolved in N,N-dimethylformamide and fibers spun from the solution dyed well with vat, acid, basic, and direct dyes, but not as well with acetate dyes as the polymer of Example 3.

When the polymerization is performed in aqueous solution the formylated polyvinyl alcohol may undergo some hydrolysis in some instances. Of course, anhydrous solvents (e. g. acetone) can be employed, in which case no substantial hydrolysis occurs.

The polyvinyl alcohol to be formylated can be obtained by known methods. Such polyvinyl alcohol contains a negligible amount of acetyl (2 per cent or less) which cannot be removed by hydrolysis. Polyvinyl alcohol is a commercially available product, and such polyvinyl alcohol can be used in formylations according to the above-described method.

In addition to N,N-dimethylformamide and N,N-dimethylacetamide, other solvents which have been found to be especially useful include ethylene carbamate, ethylene carbonate, N-methyl-2-pyrrolidone and γ-butyrolactone.

Other solvents which can be used in the preparation of solutions from our new compositions include N,N - dimethylmethoxyacetamide, dimethylcyanamide, N,N-dimethylcyanoacetamide, N,N-dimethyl-β-cyanopropionamide, glycolonitrile (formaldehyde cyanohydrin), malononitrile, ethylenecyanohydrin, dimethylsulfoxide, dimethyl sulfone, tetramethylene sulfone, tetramethylene sulfoxide, N-formylpyrrolidine, N-formylmorpholine, N,N'-tetramethylmethane-phosphonamide, etc. Generally speaking, these solvents are not as advantageous as the solvents referred to above.

The resinous products of our invention are also useful in the preparation of sheets, film, tapes, etc.

What we claim as our invention and desire secured by Letters Patent of the United States is:

1. A process for preparing a composite polymer of acrylonitrile and a polyvinyl resin comprising heating in the presence of a peroxide polymerization catalyst a mixture comprising from 60 to 90 per cent by weight of acrylonitrile and from 40 to 10 per cent by weight of formylated polyvinyl alcohol, said formylated polyvinyl alcohol containing from 10 to 40.27 per cent by weight of formyl.

2. A process for preparing a composite polymer of acrylonitrile and a polyvinyl resin comprising heating in the presence of a peroxide polymerization catalyst a mixture comprising from 60 to 90 per cent by weight of acrylonitrile and from 40 to 10 per cent by weight of formylated polyvinyl alcohol, said formylated polyvinyl alcohol containing from 20 to 38 per cent by weight of formyl.

3. A process for preparing a composite polymer of acrylonitrile and a polyvinyl resin comprising heating in the presence of an inorganic peroxide polymerization catalyst a mixture comprising from 60 to 90 per cent by weight of acrylonitrile and from 40 to 10 per cent by weight of formylated polyvinyl alcohol, said formylated polyvinyl alcohol containing from 10 to 40.27 per cent by weight of formyl.

4. A process for preparing a composite polymer of acrylonitrile and a polyvinyl resin comprising heating in the presence of an organic peroxide polymerization catalyst a mixture comprising from 60 to 90 per cent by weight of acrylonitrile and from 40 to 10 per cent by weight of formylated polyvinyl alcohol, said formylated polyvinyl alcohol containing from 10 to 40.27 per cent by weight of formyl.

5. A process for preparing a composite polymer of acrylonitrile and a polyvinyl resin comprising heating in the presence of a persulfate polymerization catalyst a mixture comprising from 60 to 90 per cent by weight of acrylonitrile and from 40 to 10 per cent by weight of formylated polyvinyl alcohol, said formylated polyvinyl alcohol containing from 10 to 40.27 per cent by weight of formyl.

6. A process for preparing a composite polymer of acrylonitrile and a polyvinyl resin comprising heating in the presence of a peroxide polymerization catalyst an aqueous emulsion comprising from 60 to 90 per cent by weight of acrylonitrile and from 40 to 10 per cent by weight of formylated polyvinyl alcohol, said formylated polyvinyl alcohol containing from 10 to 40.27 per cent by weight of formyl.

7. A process for preparing a composite polymer of acrylonitrile and a polyvinyl resin comprising heating in the presence of a peroxide polymerization catalyst an aqueous solution comprising from 60 to 90 per cent by weight of acrylonitrile and from 40 to 10 per cent by weight of formylated polyvinyl alcohol, said formylated polyvinyl alcohol containing from 10 to 40.27 per cent by weight of formyl.

8. A process for preparing a composite polymer of acrylonitrile and a polyvinyl resin comprising heating in the presence of a persulfate polymerization catalyst an aqueous emulsion comprising from 60 to 90 per cent by weight of acrylonitrile and from 40 to 10 per cent by weight of formylated polyvinyl alcohol, said formylated polyvinyl alcohol containing from 20 to 38 per cent by weight of formyl.

9. A process for preparing a composite polymer of acrylonitrile and a polyvinyl resin comprising heating in the presence of a peroxide polymerization catalyst an anhydrous organic solution comprising from 60 to 90 per cent by weight of acrylonitrile and from 40 to 10 per cent by weight of formylated polyvinyl alcohol, said formylated polyvinyl alcohol containing from 20 to 38 per cent by weight of formyl.

10. A process for preparing a composite polymer of acrylonitrile and a polyvinyl resin comprising heating a mixture comprising from 60 to 90 per cent by weight of acrylonitrile and from 40 to 10 per cent by weight of formylated polyvinyl alcohol, said formylated polyvinyl alcohol containing from 20 to 38 per cent by weight of formyl, adding a peroxide polymerization catalyst, and continuing the heating until the mixture has completely polymerized.

11. The polymer compositions obtained in claim 1.

12. The polymer compositions obtained in claim 10.

THEODORE E. STANIN.
JOSEPH B. DICKEY.

References Cited in the file of this patent

UNITED STATES PATENTS

| Number | Name | Date |
|---|---|---|
| 2,569,470 | Hagemeyer et al. | Oct. 2, 1951 |